(12) United States Patent
Bartel et al.

(10) Patent No.: US 8,529,809 B2
(45) Date of Patent: Sep. 10, 2013

(54) COMPRESSION MOLDING OF COMPOSITE MATERIAL QUASI-ISOTROPIC FLAKES

(75) Inventors: Aaron William Bartel, Mountlake Terrace, WA (US); David Eric Gideon, Edmonds, WA (US); Gregg Robert Bogucki, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 88 days.

(21) Appl. No.: 13/240,620

(22) Filed: Sep. 22, 2011

(65) Prior Publication Data
US 2013/0075947 A1 Mar. 28, 2013

(51) Int. Cl.
*B29C 43/02* (2006.01)
*B27N 3/00* (2006.01)

(52) U.S. Cl.
USPC .......................................... 264/115; 264/126

(58) Field of Classification Search
None
See application file for complete search history.

(56) References Cited

U.S. PATENT DOCUMENTS

| 4,086,378 A | 4/1978 | Kam et al. |
| 7,198,739 B2 | 4/2007 | La Forest et al. |
| 2006/0125156 A1 | 6/2006 | Woolhouse |
| 2008/0289743 A1 | 11/2008 | Tsotsis |
| 2011/0111172 A1 | 5/2011 | Gideon et al. |

FOREIGN PATENT DOCUMENTS

EP 1679171 A1 7/2006

OTHER PUBLICATIONS

International Search Report & Written Opinion dated Nov. 28, 2012 in PCT Application No. PCT/US2012/047247.

*Primary Examiner* — Mary F Theisen
(74) *Attorney, Agent, or Firm* — Hope Baldauff, LLC

(57) ABSTRACT

Concepts and technologies are disclosed herein for compression molding of composite material quasi-isotropic flakes. According to some embodiments disclosed herein, a first layer formed from a composite component material and a second layer formed from a composite component material are consolidated together to form a quasi-isotropic panel. Composite material flakes having quasi-isotropic properties ("quasi-flakes") are obtained from the quasi-isotropic panel. A compression mold is filled with the quasi-flakes, and heat is applied to the compression mold to form a part.

20 Claims, 4 Drawing Sheets

COMPRESSION MOLDING OF COMPOSITE MATERIAL QUASI-ISOTROPIC FLAKES

TECHNICAL FIELD

The present disclosure relates generally to composite materials and, more particularly, to compression molding of composite material quasi-isotropic flakes.

BACKGROUND

Parts for aircraft, automobiles, other vehicles, and/or other devices, systems, or structures may be fabricated from metals and/or alloys such as aluminum, steel, titanium, and the like. Various processes can be used to form the parts including forging, stamping, casting, machining, and the like. In some instances, however, parts having complex geometries may be difficult or impractical to obtain by way of forging, stamping, casting, machining, or other similar processes.

Similarly, some metal parts are heavy and/or dense relative to other materials. As such, other approaches to forming parts or components or devices may be desired to reduce weight of structures or devices embodying the components or devices. Thus, various approaches to replace metal parts with parts obtained with other manufacturing processes and/or materials have been attempted.

In one approach, plastics or other polymers may be injected into a mold to form a part. Injection molding of plastics, however, may provide parts that have less strength relative to metal parts. Thus, while injection molding is a relatively inexpensive manufacturing process, the reduction of weight and/or manufacturing costs may be outweighed by a reduction in structural strength, manufacturing throughput rates, and/or reliability.

In another approach, a compression molding process is used to mold chopped fiber thermoplastic material. While this process works acceptably for forming the parts in a relatively inexpensive manner, the parts obtained via this process generally have wide variability in terms of strength. Because of this variation, each part obtained must generally be mechanically proof-tested to ensure the part complies with strength requirements.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one aspect of the embodiments disclosed herein, a method for forming a molded part having quasi-isotropic properties is disclosed. The method includes consolidating a first layer formed from a composite component material having a first orientation and a second layer formed from a second composite component material having a second orientation to create a quasi-isotropic panel. The method also includes dividing the quasi-isotropic panel into a plurality of quasi-flakes, filling a compression mold with the plurality of quasi-flakes, and applying heat to the compression mold to form the molded part having quasi-isotropic properties.

According to another aspect of the embodiments disclosed herein, a method for forming a part using compression molding is disclosed. The method includes assembling a first layer formed from a first composite component material, a second layer formed from a second composite component material, and a third layer formed from a third composite component material to form a quasi-isotropic panel. The method also includes dividing the quasi-isotropic panel to form quasi-flakes from the quasi-isotropic panel. Each of the quasi-flakes includes a first portion of the first layer, a second portion of the second layer, and a third portion of the third layer. The method also includes at least partially filling a compression mold with the quasi-flakes and applying heat and pressure to the compression mold to form the part.

According to yet another aspect of the embodiments disclosed herein, a method for forming a part from quasi-flakes having quasi-isotropic properties is disclosed. The method includes consolidating a first layer formed from a first composite component material and having embedded fibers arranged in a first orientation, a second layer formed from a second composite component material and having embedded fibers arranged in a second orientation, and a third layer formed from a third composite component material and having embedded fibers arranged in a third orientation to form a quasi-isotropic panel. The method includes dividing the quasi-isotropic panel to form the quasi-flakes from the quasi-isotropic panel. Each of the quasi-flakes can include a first portion of the first layer, a second portion of the second layer, and a third portion of the third layer. The method also includes filling a compression mold with the quasi-flakes, and applying heat and pressure to the compression mold to form the part.

The features, functions, and advantages discussed herein can be achieved independently in various embodiments of the concepts and technologies disclosed herein, or may be combined in yet other embodiments, further details of which can be seen with reference to the following description and drawings.

DETAILED DESCRIPTION

Figure 1:
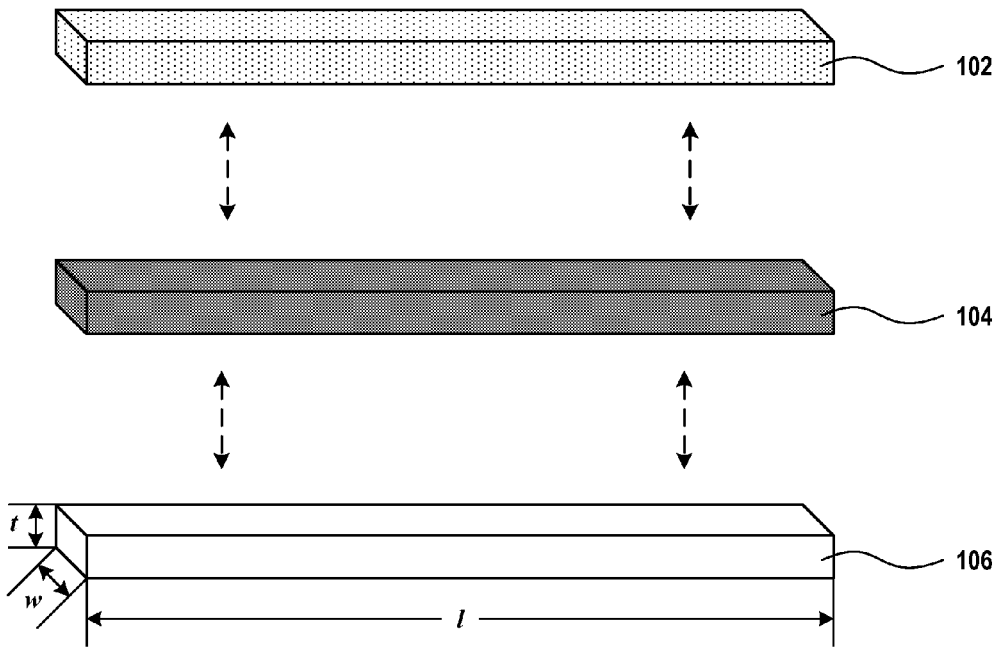
FIG. 1 is a line diagram schematically illustrating fabrication of a quasi-isotropic panel, according to an illustrative embodiment.

The following detailed description is directed to compression molding of composite material quasi-isotropic flakes ("quasi-flakes"). According to the concepts and technologies disclosed herein, composite fiber material is assembled from three or more layers of fiber material. In various embodiments, the fibers of the respective layers are arranged in specific orientations to provide strength in one of several directions, corresponding to the orientations of the fibers. For example, fibers of a three-layer quasi-isotropic panel may be arranged at zero degrees, plus sixty degrees, and minus sixty degrees, respectively, to provide strength in various directions. Similarly, fibers of a four-layer quasi-isotropic panel may be arranged at zero degrees, plus forty-five degrees, minus forty-five degrees, and ninety degrees, respectively, to provide strength in various directions.

The quasi-isotropic panel is cut, divided, or otherwise processed to produce the quasi-flakes. As used herein, quasi-flakes or other composite flakes having "quasi-isotropic properties" provide structural strength in several directions, and not only in one direction. As such, parts formed via compression molding of the quasi-flakes disclosed herein can be stronger than parts formed from single layer of fiber impregnated thermoplastic material flakes. The quasi-flakes can be placed into a compression mold and heat and pressure are applied to the compression mold to obtain a part from the quasi-flakes.

According to some implementations, parts obtained using the disclosed compression molding of quasi-flakes can be stronger than parts obtained by using single-ply fiber thermoplastic materials. In some embodiments, the increased strength results, at least in part, from the orientation of the fibers of the various layers of the quasi-flakes. Furthermore, parts obtained by the disclosed processes can be more consistent with one another, in terms of structural strength and/or other properties. As such, embodiments of the concepts and technologies disclosed herein can be used to ensure that parts comply with various quality requirements and/or specifications. These and other advantages and features will become apparent from the description of the various embodiments below.

In the following detailed description, references are made to the accompanying drawings that form a part hereof and that show, by way of illustration, specific embodiments or examples. In referring to the drawings, like numerals represent like elements throughout the several figures.

Figure 2:
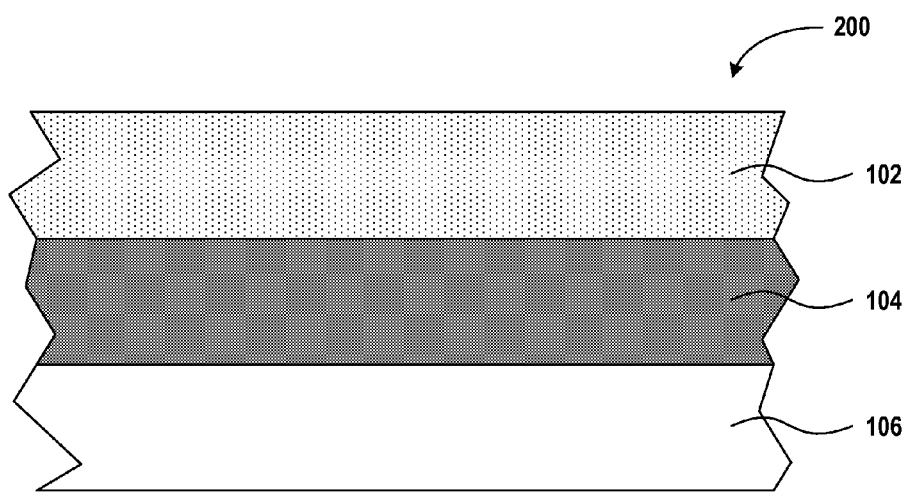
FIG. 2 is a line diagram showing a quasi-isotropic panel, according to an illustrative embodiment.

FIGS. 1-2 show aspects of forming quasi-isotropic panels for creating quasi-flakes for use as disclosed herein. As shown in FIGS. 1-2, three or more layers of material ("layers") 102, 104, 106 can be assembled or consolidated together to form a quasi-isotropic panel having quasi-isotropic properties (referred to herein as a "quasi-isotropic panel") 200. While FIGS. 1-2 illustrate a three-layer quasi-isotropic panel 200, it should be understood that this embodiment is illustrative, and should not be construed as being limiting in any way. In particular, according to various embodiments, the quasi-isotropic panel 200 includes three layers, four layers, five to eight layers, or more than eight layers.

In the illustrated embodiment, the layer 104 is a layer of material having fibers that are orientated in a first direction. According to various embodiments, the layer 104 is formed from a base material with pre-impregnated or embedded unidirectional fibers. In some embodiments, the layer 104 is formed from a continuous fiber thermoplastic composite unidirectional tape prepreg, though this is not necessarily the case. The base material can include, in various implementations, a thermoplastic such as, for example, polyphenylene sulfide ("PPS"), polyetherimide ("PEI"), a polyaryletherketone ("PAEK") such as, for example, polyether ether ketone ("PEEK") or polyetherketoneketone ("PEKK"), or other thermoplastics; a woven fabric material; another material; or the like. In some embodiments, the layer 104 includes embedded or pre-impregnated fibers. The fibers can include or can be formed from any suitable material. In various implementations, the fibers are formed from carbon, fiberglass, aramids, graphite, ceramic, and/or other materials.

Figure 3:
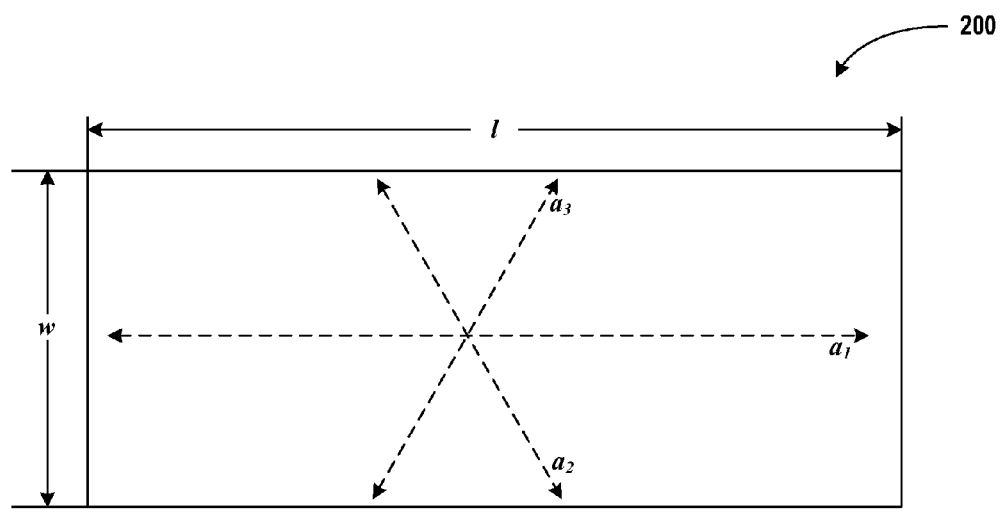
FIG. 3 is a line diagram showing a top elevation view of the quasi-isotropic panel, according to an illustrative embodiment.

In other embodiments, the layer 104 is formed from other materials that can be obtained via a number of processes. For example, the material used to form the layer 104, and other layers of the quasi-isotropic panel 200, can include, but are not limited to, dry fiber and/or film-stack materials, semi-preg obtained by chemically or thermally bonding fiber film to a thermoplastic or other base material, combinations thereof, and the like. Because various materials can be used to form the layers of the quasi-isotropic panel 200, the illustrated and described materials should be understood as being merely illustrative of the concepts and technologies disclosed herein, and should not be construed as being limited in any way. In the illustrated embodiment, the fibers of the layer 104 are oriented in a first orientation. The first orientation can correspond to a zero-degree orientation, if desired. FIG. 3 shows a top view of the quasi-isotropic panel 200 and illustrates orientations of fibers associated with the three layers 102, 104, 106 illustrated in FIGS. 1-2. As is best visible in FIG. 3, the zero-degree orientation of fibers of the layer 104 can extend, for example, along a first axis $a_1$ that extends along a length of the quasi-isotropic panel 200, e.g., from the left-to-right or right-to-left of FIG. 3, or in other directions. It should be understood that these embodiments are illustrative, and should not be construed as being limiting in any way.

Referring again to FIGS. 1-2, the illustrated embodiment of the layer 102 is a layer of material having fibers oriented in a second direction. The layer 102 can be, but is not necessarily, formed from the same material used to form the layer 104. In the illustrated embodiment, the fibers of the layer 102 can be oriented in a plus- or minus-sixty degree orientation, relative to the orientation of the fibers of the layer 104 and/or the zero-degree orientation described above. As shown in FIG. 3, the second orientation can extend along the second axis $a_2$, the third axis $a_3$, or another axis not shown in FIG. 3. The sixty degrees or other angular measurements described herein can be measured along any axis extending in any direction.

As noted above, in some embodiments the sixty degrees is measured with respect to the axis $a_1$ that is illustrated in FIG. 3 as extending along the length of the layer 104 as described above, though this embodiment is illustrative. In other embodiments, the fibers of the layer 102 are oriented in a plus- or minus-forty-five degree orientation, relative to the orientation of the fibers of the layer 104. In yet other embodiments, the fibers of the layer 102 are oriented in ninety degree orientation, relative to the orientation of the fibers of the layer 104. It should be understood that these embodiments are illustrative, and should not be construed as being limiting in any way.

Similarly, the layer 106 is a layer of material having fibers oriented in a third direction. The layer 106 can be, but is not necessarily, formed from the same material used to form the layer 102 and/or the layer 104. In the illustrated embodiment, the fibers of the layer 106 are oriented in a plus- or minus-sixty degree orientation, relative to the orientation of the fibers of the layer 104. As such, the third orientation can extend along the second axis $a_2$, the third axis $a_3$, or another axis not shown in FIG. 3. In the three-layer embodiment shown in FIGS. 1-3, the fibers of the layer 106 are oriented one-hundred-twenty degrees relative to the fibers of the layer 102. It should be understood that this embodiment is illustrative, and should not be construed as being limiting in any way.

In other embodiments, as noted above, the fibers of the layer 106 can be oriented in a plus- or minus-forty-five degree orientation, relative to the orientation of the fibers of the layer 104. In yet other embodiments, the fibers of the layer 102 can be oriented in a ninety degree orientation, relative to the orientation of the fibers of the layer 104. It should be understood that these embodiments are illustrative, and should not be construed as being limiting in any way.

In one implementation (not shown in the FIGURES), the quasi-isotropic panel 200 includes four layers. The fibers of a first of the four layers are oriented in a first orientation such as along a length of the layer. The fibers of a second of the four layers are oriented in a second orientation that is orientated in a ninety degree orientation, relative to the first orientation. The fibers of a third of the four layers are oriented in a third orientation that is orientated in a plus forty-five degree orientation, relative to the first orientation. The fibers of a fourth of the four layers are oriented in a fourth orientation that is orientated in a minus forty-five degree orientation, relative to the first orientation. It should be understood that this embodiment is illustrative, and should not be construed as being limiting in any way.

According to various implementations, the quasi-isotropic panel 200 has a thickness t. According to various implementations, the thickness t ranges from about five thousandths of an inch (~0.005 inches) to about four hundredths of an inch (~0.040 inches). Other thicknesses are possible and are contemplated. In some embodiments, the quasi-isotropic panel has a width w. According to various implementations, the width w ranges from about a quarter of an inch (~0.25 inches) to about two-and-a-half inches (~2.5 inches). Other widths are possible and are contemplated. The quasi-isotropic panel 200 can be configured as a substantially continuous tape of material, and the length l of the quasi-isotropic panel 200 can therefore vary widely. Because other dimensions and/or configurations of the quasi-isotropic panel 200 are possible, it should be understood that these embodiments are illustrative, and should not be construed as being limiting in any way.

Figure 4:
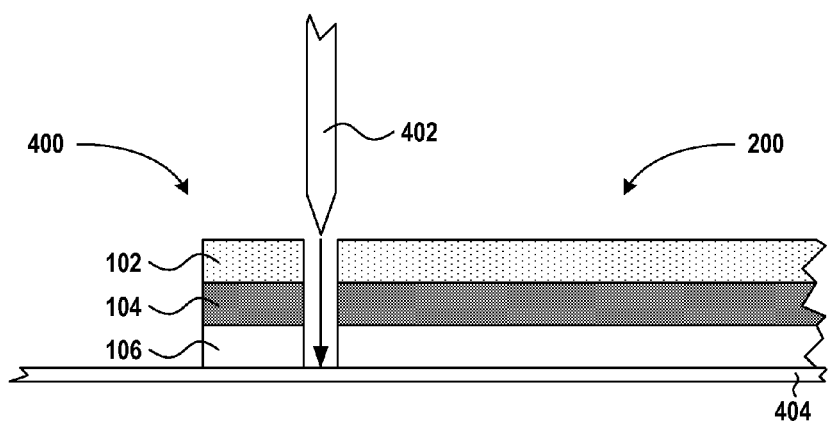
FIG. 4 is a line diagram schematically illustrating fabrication of quasi-flakes, according to an illustrative embodiment.

Turning now to FIG. 4, aspects of fabricating quasi-isotropic composite material flakes ("quasi-flakes") 400 from the quasi-isotropic panel 200 will be described in detail. As shown in FIG. 4, the quasi-flakes 400 can be formed or fabricated from the quasi-isotropic panel 200, though this is not necessarily the case. In particular, the quasi-flakes 400 can be formed from any composite materials disclosed herein and are not limited to the three-layer quasi-isotropic panel 200 illustrated in the FIGURES. As such, the illustrated embodiment is illustrative, and should not be construed as being limited in any way.

As shown in FIG. 4, a cutting tool 402 or other tooling can be used to cut, divide, or otherwise form, fabricate, or obtain the quasi-flakes 400 from the quasi-isotropic panel 200. Other tooling such as punches, lasers, saws, and/or other structures or devices can be used, if desired, to form the quasi-flakes 400. According to various embodiments, the quasi-flakes 400 can have varied dimensions and/or shapes. For example, in some embodiments the quasi-flakes 400 are formed with various shapes such as squares, ellipses, circles, rectangles, triangles, and the like. Because the thickness of the quasi-isotropic panel 200 can be varied, the quasi-flakes 400 can approximate cubes in some embodiments, such as the embodiment illustrated in FIG. 4. It should be understood that this embodiment is illustrative, and should not be construed as being limiting in any way.

In some embodiments, the quasi-isotropic panel 200 is fed to the cutting tool 402 along a conveyor or other feed surface or mechanism, shown generally at 404. Thus, some embodiments of the concepts and technologies disclosed herein provide methods for forming the quasi-flakes 400 from a substantially continuous feed of the quasi-isotropic panel 200. In some embodiments, the quasi-isotropic panel 200 is disposed on a continuous roll or other structure and fed to the cutting tool 402 along the feed surface or mechanism. It should be understood that this embodiment is illustrative, and should not be construed as being limiting in any way.

Figure 5A:
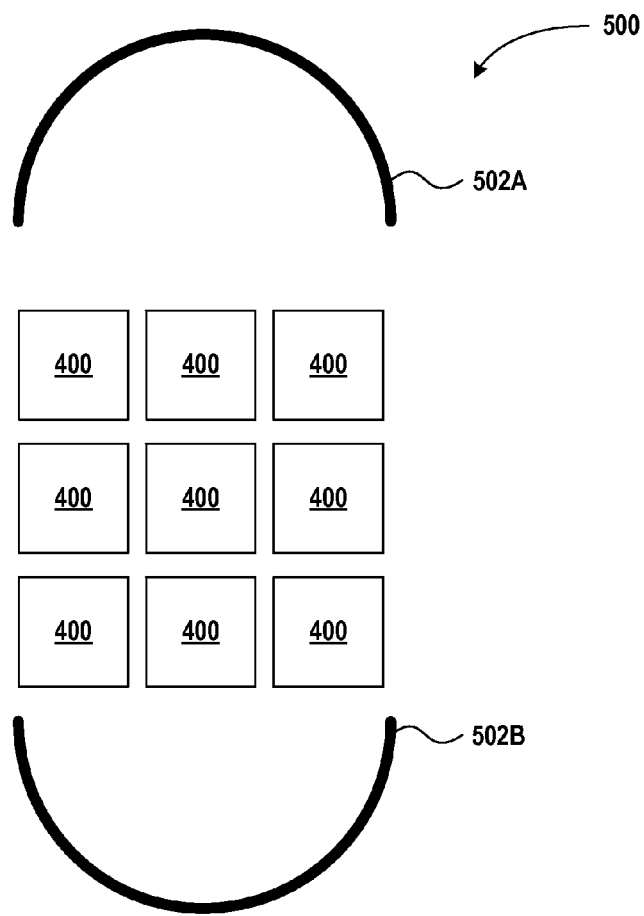
FIG. 5A is a line diagram illustrating aspects of compression molding of quasi-flakes, according to an illustrative embodiment.
Figure 5B:
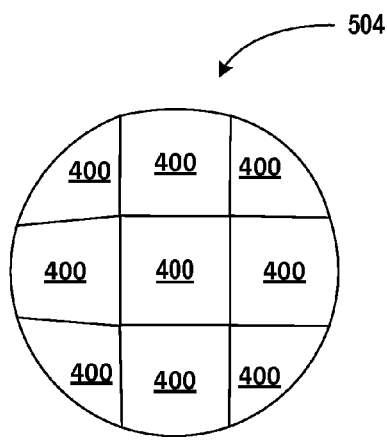
FIG. 5B is a line diagram illustrating additional aspects of compression molding of quasi-flakes, according to an illustrative embodiment.

Turning now to FIG. 5A-5B, aspects of compression molding of quasi-flakes 400 will be described in detail, according to one illustrative embodiment. As shown in FIG. 5A, a compression mold 500 can be provided. The compression mold 500 can include a top portion 502A and a bottom portion 502B, though this is not necessarily the case. In some embodiments, the compression mold 500 includes a female portion and a male portion configured to nest into the female portion, for example. Other embodiments of the compression mold 500 are contemplated and are possible. As such, the illustrated embodiment is illustrative, and should not be construed as being limited in any way. Although not shown in FIG. 5A, it should be understood that various structures such as heating mechanisms, motors, vacuum lines, compressed air lines, lubrication lines, and/or other structures can be included in or proximate to the compression mold 500.

In the illustrated embodiment, the compression mold 500 is used to create spherical parts 504, as shown in FIG. 5B. This embodiment is illustrative and should not be construed as being limited in any way, as the compression mold 500 can be configured in any desired shape. For example, in one embodiment the mold 500 is configured as a compression mold for forming stowbin fittings for a 787 aircraft from BOEING COMPANY in Chicago, Ill. Because the compression mold 500 can be used to form any desired parts, these embodiments should be understood as being illustrative.

During operation of the compression mold 500, the quasi-flakes 400 are placed into the compression mold 500. The top portion 502A and the bottom portion 502B are closed or joined together to seal the compression mold 500. After sealing the compression mold 500, heat and pressure are applied to the compression mold 500 or the quasi-flakes 400 within the compression mold 500. The heat and pressure applied to the compression mold 500 or the quasi-flakes 400 in the compression mold 500 causes the quasi-flakes 400 to mold to the shape of the compression mold 500. Thus, as shown in FIG. 5B, a part 504 can be formed from the quasi-flakes 400.

According to various implementations, the concepts and technologies disclosed herein are used to provide parts 504 having predictable and/or consistent structural strength and/or other properties in various directions. In the above example, it can be appreciated that the quasi-flakes 400 can be distributed within the part 504 in various orientations. Because the quasi-flakes 400 have fibers oriented in at least three directions, however, a portion of the resulting part 504 can have substantially quasi-isotropic properties in that at least some fibers of one particular quasi-flake 400 can be oriented in a direction that is similar to fibers of an adjacent quasi-flake 400. Thus, embodiments of the concepts and technologies disclosed herein can help eliminate some of the unpredictability inherent in fiber thermoplastic compression molding processes that result in unpredictable and/or inconsistent fiber orientations, and as a result, structural strength and/or other properties in various directions. It should be understood that these embodiments are illustrative, and should not be construed as being limiting in any way.

Figure 6:
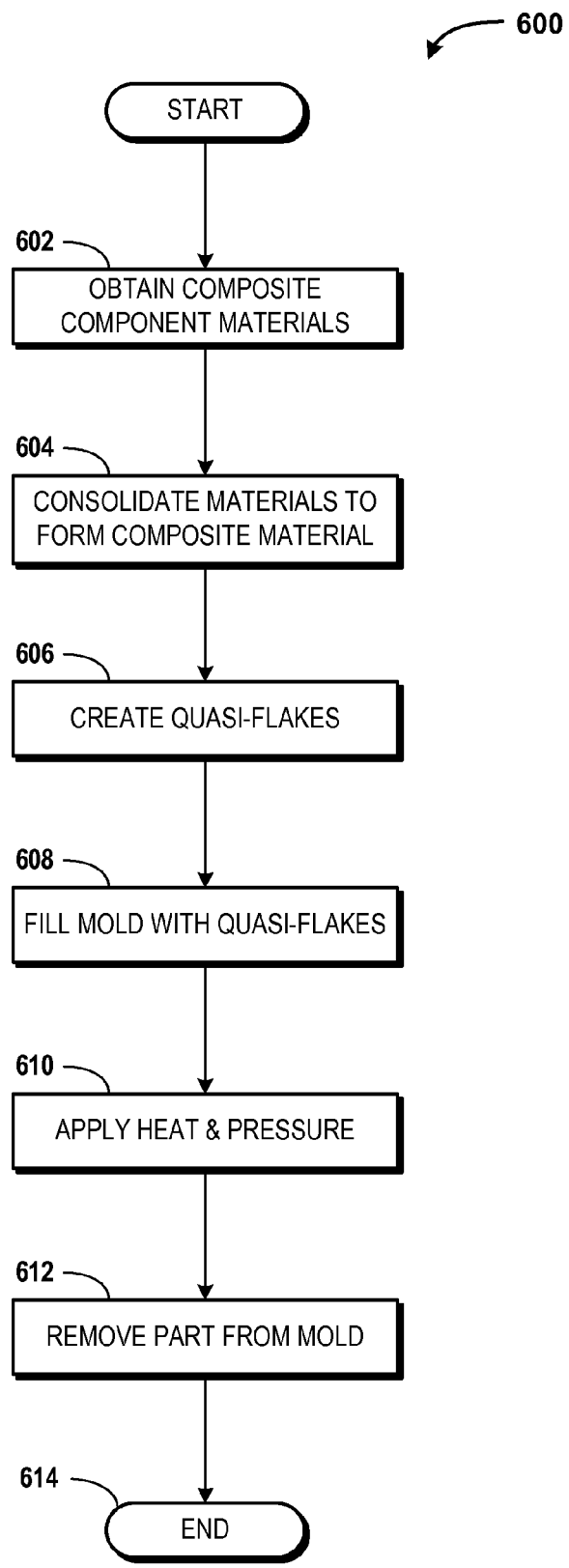
FIG. 6 is a flow diagram illustrating aspects of a method for compression molding of quasi-flakes, according to an illustrative embodiment.

Turning now to FIG. 6, aspects of a method 600 for compression molding of quasi-flakes 400 will be described in detail, according to an illustrative embodiment. It should be understood that the operations of the method 600 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. It also should be understood that the illustrated method 600 can be ended at any time and need not be performed in its entirety.

The method 600 begins at operation 602, wherein component materials for forming a quasi-isotropic panel are obtained. As used herein, "obtaining" materials, including the component materials, includes manufacturing, receiving, and/or retrieving the materials from a storage location, from a third party, and/or from any other source or location. As explained above, the component materials can include thermoplastics, plastics, and/or other materials including, but not limited to, prepreg. The materials also can include embedded or pre-impregnated fibers formed from carbon, fiberglass, ceramics, aramids, and/or other materials. Thus, the component materials can include fiber thermoplastics and/or other materials. With reference to FIG. 1, for example, the component materials can correspond to the materials used to form the respective layers 102, 104, 106 of the quasi-isotropic panel 200. Because additional or alternative materials can be formed, received, retrieved, and/or otherwise obtained in operation 602, it should be understood that this embodiment is illustrative, and should not be construed as being limiting in any way.

From operation 602, the method 600 proceeds to operation 604, wherein the materials obtained in operation 602 are assembled or consolidated together to form the quasi-isotropic panel. The component materials can be assembled using press forming of the various component materials, continuous compression molding processes, stamp forming, by using adhesives, by using an autoclave, and/or by using other processes and/or devices. In the example illustrated in FIGS. 1-2, operation 604 can correspond to assembling the layers 102, 104, 106 together using one or more of the above-mentioned processes to form the quasi-isotropic panel 200. It should be understood that this embodiment is illustrative, and should not be construed as being limiting in any way.

From operation 604, the method 600 proceeds to operation 606, wherein quasi-flakes are created from the quasi-isotropic panel formed in operation 604. With reference to the illustrated embodiments, the functionality described herein with reference to operation 606 can correspond to cutting or otherwise dividing the quasi-isotropic panel 200 using the tooling 402 to form the quasi-flakes 400. It should be understood that this embodiment is illustrative, and should not be construed as being limiting in any way.

From operation 606, the method 600 proceeds to operation 608, wherein a compression mold is filled with the quasi-flakes formed in operation 606. The compression mold filled in operation 608 can have any desired shape or configuration and/or can have any desired size. With reference to the illustrated embodiments, the functionality described herein with reference to operation 608 can correspond to filling the compression mold 500 with the quasi-flakes 400. It should be understood that this embodiment is illustrative, and should not be construed as being limiting in any way.

From operation 608, the method 600 proceeds to operation 610, wherein heat and/or pressure are applied to the compression mold in which the quasi-flakes are placed in operation 608. Depending upon the materials used to form the quasi-isotropic panels, the amount of pressure and/or heat applied to the quasi-flakes 400 can vary widely. For example, in one contemplated embodiment, the quasi-flakes 400 are formed from a quasi-isotropic panel. The quasi-isotropic panel, meanwhile, can be formed from three or more layers of material such as, for example, APC brand PEKK thermoplastic polymer from CYTEC ENGINEERED MATERIALS in Woodland Park, N.J., which has a glass transition temperature of about two hundred fifty degrees Celsius and an operational temperature up to about four hundred degrees Celsius. As such, the quasi-flakes can have an operational temperature range of about two hundred fifty degrees Celsius to about four hundred degrees Celsius. Because other materials can be used, it should be understood that this operational temperature range is illustrative and should not be construed as being limited in any way. Thus, operation 610 can include applying pressure to the quasi-flakes 400 while simultaneously adding heat to the quasi-flakes 400. It should be understood that this embodiment is illustrative, and should not be construed as being limiting in any way.

From operation 610, the method 600 proceeds to operation 612, wherein a finished part is removed from the compression mold. Although not shown in FIG. 6, it can be appreciated that the compression mold may be cooled prior to removing the finished part from the compression mold. With reference to the illustrated embodiments, the functionality described herein with reference to operation 612 can correspond to removing the part 504 from the compression mold 500. It should be understood that this embodiment is illustrative, and should not be construed as being limiting in any way.

From operation 612, the method 600 proceeds to operation 614. The method 600 ends at operation 614. Although not illustrated in FIG. 6, it should be understood that various operations of the method 600 and/or the method 600 in its entirety can be iterated any number of times. Although not shown in FIG. 6, it should be understood that various post-processing operations can be performed such as, for example, machining the part, painting the part, labeling or packaging the part, other operations, and the like.

Based on the foregoing, it should be appreciated that concepts and technologies for compression molding of quasi-flakes are provided herein. Although the subject matter presented herein has been described in language specific to structural features and methodological acts, it is to be understood that the invention defined in the appended claims is not necessarily limited to the specific features or acts described herein. Rather, the specific features and acts are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A method for forming a molded part having quasi-isotropic properties, the method comprising:
    consolidating a first layer formed from a first composite component material having a first orientation and a second layer formed from a second composite component material having a second orientation to create a quasi-isotropic panel;
    dividing the quasi-isotropic panel into a plurality of quasi-flakes;
    filling a compression mold with the plurality of quasi-flakes; and
    applying heat to the compression mold to form the molded part having quasi-isotropic properties.

2. The method of claim 1, wherein at least one of the first composite component material or the second composite component material comprises a tape of unidirectional pre-impregnated thermoplastic.

3. The method of claim 1, wherein consolidating the first layer and the second layer to crate the quasi-isotropic panel comprises assembling the first layer and the second layer together using at least one of a press forming process or a continuous compression molding process.

4. The method of claim 1, wherein at least one of the first composite component material or the second composite component material comprises a thermoplastic.

5. The method of claim 4, wherein at least one of the first layer or the second layer comprises fibers.

6. The method of claim 5, wherein the fibers are formed from carbon.

7. The method of claim 5, wherein the first composite component material and the second composite component material comprise fibers, wherein the fibers of the first component material are oriented in the first orientation, and wherein the fibers of the second composite component material are oriented in the second orientation.

8. The method of claim 7, wherein the first orientation is rotated about sixty degrees relative to the second orientation.

9. The method of claim 7, wherein the first orientation is rotated about forty-five degrees relative to the second orientation.

10. The method of claim 7, wherein the quasi-isotropic panel comprises a third layer formed from a third composite component material, wherein the quasi-isotropic panel is a thermoplastic having fibers arranged in a third orientation.

11. A method for forming a part using compression molding, the method comprising:
assembling a first layer formed from a first composite component material, a second layer formed from a second composite component material, and a third layer formed from a third composite component material to form a quasi-isotropic panel;
dividing the quasi-isotropic panel to form quasi-flakes from the quasi-isotropic panel, each of the quasi-flakes comprising a first portion of the first layer, a second portion of the second layer, and a third portion of the third layer;
at least partially filling a compression mold with the quasi-flakes; and
applying heat and pressure to the compression mold to form the part.

12. The method of claim 11, wherein at least one of the first composite component material, the second composite component material, or the third composite component material comprises a thermoplastic.

13. The method of claim 12, wherein the thermoplastic comprises a polyetherketoneketone, and wherein at least one of the first composite component material, the second composite component material, or the third composite component material comprises fibers.

14. The method of claim 12, wherein the first layer, the second layer, and the third layer comprise fibers, and wherein
the fibers of the first layer are oriented in a first orientation,
the fibers of the second layer are oriented in a second orientation, and
the fibers of the third layer are orientated in a third orientation.

15. The method of claim 12, wherein the part comprises a stowbin fitting for an aircraft, and wherein the first composite component material, the second composite component material, and the third composite component material are the same material.

16. A method for forming a part from quasi-flakes having quasi-isotropic properties, the method comprising:
consolidating a first layer formed from a first composite component material and having embedded fibers arranged in a first orientation, a second layer formed from a second composite component material and having embedded fibers arranged in a second orientation, and a third layer formed from a third composite component material and having embedded fibers arranged in a third orientation to form a quasi-isotropic panel;
dividing the quasi-isotropic panel to form the quasi-flakes from the quasi-isotropic panel, each of the quasi-flakes comprising a first portion of the first layer, a second portion of the second layer, and a third portion of the third layer;
filling a compression mold with the quasi-flakes; and
applying heat and pressure to the compression mold to form the part.

17. The method of claim 16, wherein at least one of the first composite component material, the second composite component material, or the third composite component material comprises a thermoplastic.

18. The method of claim 17, wherein the thermoplastic comprises a polyaryletherketone.

19. The method of claim 17, wherein the thermoplastic comprises a polyetherimide.

20. The method of claim 17, wherein the thermoplastic comprises a polyphenylene sulfide.

* * * * *